(12) United States Patent
Amin et al.

(10) Patent No.: US 10,491,003 B2
(45) Date of Patent: Nov. 26, 2019

(54) MULTIPLE INPUT SINGLE INDUCTOR MULTIPLE OUTPUT REGULATOR

(71) Applicant: Intel Corporation, Santa Clara, CA (US)

(72) Inventors: Sally Amin, Hillsboro, OR (US); Sergio Carlo, Hillsboro, OR (US); Harish Krishnamurthy, Hillsboro, OR (US); Christopher Schaef, Lebanon, NH (US); Vaibhav Vaidya, Portland, OR (US)

(73) Assignee: INTEL CORPORATION, Santa Clara, CA (US)

(*) Notice: Subject to any disclaimer, the term of this patent is extended or adjusted under 35 U.S.C. 154(b) by 410 days.

(21) Appl. No.: 14/998,328

(22) Filed: Dec. 23, 2015

(65) Prior Publication Data
US 2017/0187187 A1 Jun. 29, 2017

(51) Int. Cl.
*H02J 3/38* (2006.01)
*H02J 7/00* (2006.01)
*H02M 3/158* (2006.01)

(52) U.S. Cl.
CPC ............. *H02J 3/381* (2013.01); *H02J 3/383* (2013.01); *H02J 7/0029* (2013.01); *H02M 3/1588* (2013.01); *H02J 7/0065* (2013.01); *H02J 2007/0037* (2013.01); *Y02B 40/90* (2013.01); *Y02B 70/1466* (2013.01)

(58) Field of Classification Search
CPC .... H02J 3/383; H02J 2007/0037; H02J 3/381; H02J 7/0029; H02J 7/0065; H02M 3/1588; Y02B 70/1466; Y02B 40/90
See application file for complete search history.

(56) References Cited

U.S. PATENT DOCUMENTS

| 5,414,341 | A  | * | 5/1995 | Brown | ............. | G05F 1/563 |
|---|---|---|---|---|---|---|
| | | | | | | 323/259 |
| 6,512,411 | B2 | * | 1/2003 | Meng | ............. | H02M 3/07 |
| | | | | | | 307/110 |
| 7,068,206 | B2 | * | 6/2006 | Augusto | ............. | H03M 1/125 |
| | | | | | | 341/120 |

(Continued)

FOREIGN PATENT DOCUMENTS

| EP | 2541721 | 1/2013 |
|---|---|---|
| JP | 2011250605 | 12/2011 |
| JP | 2012080683 | 4/2012 |

OTHER PUBLICATIONS

Dictionary,"definition of Asynchronous," pp. 1.*

(Continued)

*Primary Examiner* — Thienvu V Tran
(74) *Attorney, Agent, or Firm* — Womble Bond Dickinson (US) LLP

(57) ABSTRACT

A power regulator includes a plurality of harvester switches, each coupled to receive a separate energy source, a plurality of load switches, each coupled to supply power to a separate load, an inductor to store energy received from one or more energy sources and release the energy to supply the power to one or more loads and a controller to control charging of the inductor via activation of one or more of the harvester switches and discharging of the inductor via activation of one or more of the load switches.

19 Claims, 11 Drawing Sheets

(56) References Cited

U.S. PATENT DOCUMENTS

| | | | | |
|---|---|---|---|---|
| 7,570,036 | B2* | 8/2009 | Tang | H02M 3/1584 |
| | | | | 323/272 |
| 7,800,928 | B1* | 9/2010 | Dernovsek | H02M 7/523 |
| | | | | 363/132 |
| 8,243,410 | B2* | 8/2012 | Ayyanar | H02M 3/1584 |
| | | | | 361/111 |
| 8,598,857 | B2* | 12/2013 | Pierson | H02M 3/1584 |
| | | | | 323/272 |
| 2002/0195882 | A1* | 12/2002 | Marino | H02M 1/32 |
| | | | | 307/125 |
| 2005/0264271 | A1 | 12/2005 | Lam et al. | |
| 2007/0262760 | A1* | 11/2007 | Liu | H02M 3/1588 |
| | | | | 323/282 |
| 2008/0231115 | A1* | 9/2008 | Cho | H02J 1/08 |
| | | | | 307/41 |
| 2011/0043181 | A1* | 2/2011 | Jing | H02M 3/158 |
| | | | | 323/288 |
| 2012/0274134 | A1* | 11/2012 | Gasparini | H02M 3/1584 |
| | | | | 307/31 |
| 2013/0147457 | A1* | 6/2013 | Kim | H02M 3/158 |
| | | | | 323/311 |
| 2014/0246908 | A1* | 9/2014 | Chew | H02M 3/156 |
| | | | | 307/24 |
| 2014/0328087 | A1* | 11/2014 | Tang | H02M 3/156 |
| | | | | 363/21.01 |
| 2015/0061569 | A1* | 3/2015 | Alexander | B60L 11/1809 |
| | | | | 320/101 |
| 2016/0099582 | A1* | 4/2016 | Ramorini | H02J 7/0052 |
| | | | | 320/162 |

OTHER PUBLICATIONS

Notification of Transmittal of the International Search Report and the Written Opinion of the International Searching Authority issued for International Patent Application No. PCT/US2016/059181, dated Feb. 2, 2017.

Dongsheng Ma, et al., "Single-Inductor Multiple-Output Switching Converters With Time-Multiplexing Control in Discontinuous Conduction Mode", IEEE Journal of Solid-State Circuits, Jan. 2003, vol. 38, No. 1, pp. 89-100.

PCT/US2016/059181, International Preliminary Report and Written Opinion, dated Jul. 5, 2018, (10 pages).

\* cited by examiner

MULTIPLE INPUT SINGLE INDUCTOR MULTIPLE OUTPUT REGULATOR

FIELD

Embodiments described herein generally relate to computer systems. More particularly, embodiments relate to power delivery to computer systems.

BACKGROUND

The Internet of Things (IoT) is a network of physical objects or "things" embedded with electronics, software, sensors, and network connectivity, which enables these objects to collect and exchange data. The IoT allows objects to be sensed and controlled remotely across existing network infrastructure, creating opportunities for more direct integration between the physical world and computer-based systems, and resulting in improved efficiency, accuracy and economic benefit. Each thing is uniquely identifiable through its embedded computing system but is able to interoperate within the existing Internet infrastructure.

Despite the benefits that IoT devices may provide, their large size and poor battery life currently makes them unsuitable for practical use. Energy harvesting is an attractive solution for extending the battery life in IoT applications. Moreover, power delivery and generation for multiple voltage rails can be a bottleneck in terms of form factor (e.g., by occupying a large portion of an overall printed circuit board footprint) and cost. However, traditional energy harvesting architectures comprises two stages of DC-DC converters, which results in low overall efficiency, large form factor and cost.

BRIEF DESCRIPTION OF THE DRAWINGS

Embodiments are illustrated by way of example, and not by way of limitation, in the figures of the accompanying drawings in which like reference numerals refer to similar elements.

DETAILED DESCRIPTION

Figure 1:
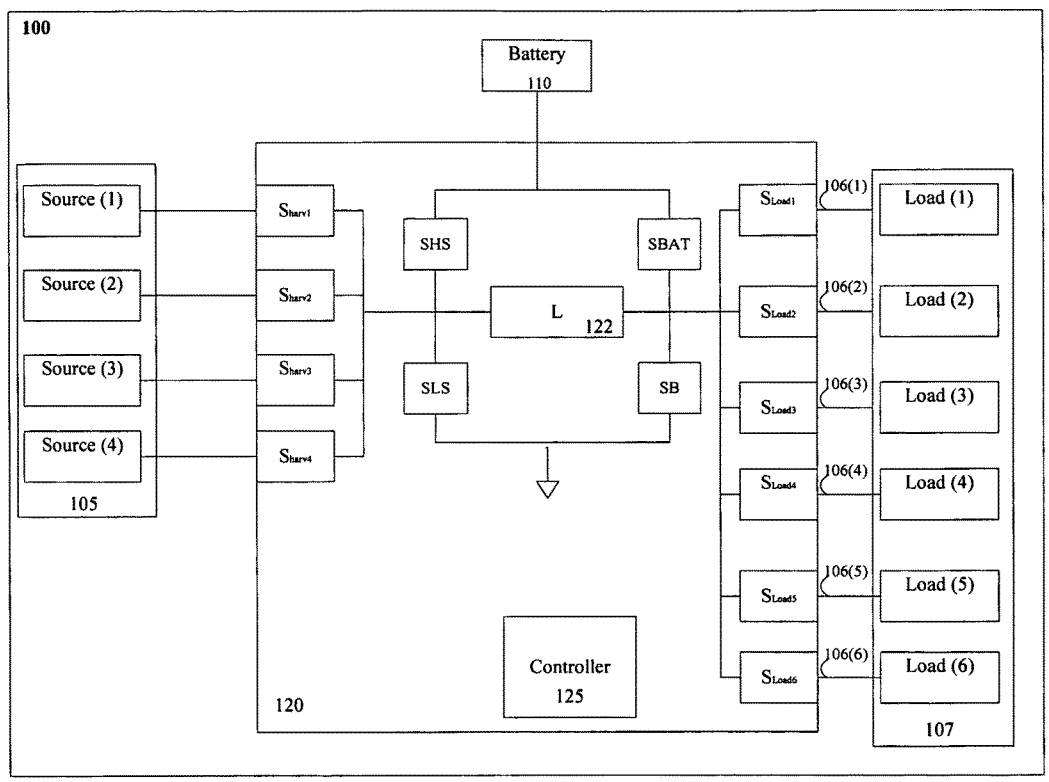
FIG. 1 illustrates one embodiment of a multiple input single inductor multiple output (MISIMO) architecture.

In the following description, numerous specific details are set forth. However, embodiments, as described herein, may be practiced without these specific details. In other instances, well-known circuits, structures and techniques have not been shown in details in order not to obscure the understanding of this description.

Embodiments provide for regulating the voltage of multiple harvesting sources for maximum power extraction, as well as regulating multiple power rails with a wide load range using single inductor within a single stage of conversion to maximize efficiency and minimize form factor. In such embodiments, varying "ON" times for the charging phase of the inductor is used to regulate the harvester voltages to maintain maximum power. Further varying ON times for the discharge of the inductor are manipulated to regulate the voltages for the several rails implemented for loads, such as sensors, communications and processor subsystems.

In a further embodiment, a control scheme is implemented based on asynchronously enabling energy pulses to regulate output voltages. In this embodiment, energy is increased (e.g., manipulated through high-side ON time $T_{on}$) if one or more output voltages being sensed by comparators inform a control unit that the voltages are below a voltage threshold. Otherwise, the next energy pulse, triggered by an under-voltage event, will be shorter.

In one embodiment, the pulse width is determined by a counter that counts up for under-voltage and down for an overvoltage at a zero current crossing event. Further, the counter value may be implemented to scale controller quiescent power. At light loads, the controller performance (mainly due to comparators) may be relaxed. As a result, the power-delay tradeoff in the comparators is used to reduce bias current at light loads at the cost of increased delay.

Due to the asynchronous nature of the system, the zero-current detection circuit can be shut off and turned on in the event that an energy pulse is required. In such an embodiment, the zero-current detection circuit is turned ON in the de-energizing phase (low-side turn-on) of the energy pulse. This effectively reduces the zero-current detection circuit average power consumption at light loads where pulses are sparser (e.g., energy pulses are fewer, reducing current sensor operation time) and the zero-current detection circuit is off most of the time. In one embodiment, the turn on of the power switches is asynchronous in nature and proves only as many pulses as necessary to sustain the voltage levels at the outputs, thus providing a high energy conversion efficiency.

Throughout this document, terms like "logic", "component", "module", "framework", "engine", "tool", and the like, may be referenced interchangeably and include, by way of example, software, hardware, and/or any combination of software and hardware, such as firmware. Further, any use of a particular brand, word, term, phrase, name, and/or acronym, "characteristic", "user", "receiver", "sender", "personal device", "location", "smart device", "mobile computer", etc., should not be read to limit embodiments to software or devices that carry that label in products or in literature external to this document.

FIG. 1 illustrates one embodiment of a printed circuit board (PCB) 100. In one embodiment, PCB 100 is a motherboard that includes energy sources 105 (e.g., power stage), loads 107, battery 110 and power converter 120. According to one embodiment, power converter 120 is a multiple input single inductor multiple output (MISIMO) 120 regulator that aggregates maximum power from the multiple energy sources 105(1-4) and regulates multiple power rails 106 with wide load 107 ranges. In such an embodiment, energy sources may comprise different sources (e.g., solar, thermal, vibration and radio frequency (RF), etc.), each having a different power range. Similarly, loads 107 may comprise different applications (e.g., Bluetooth application, sensors, micro-controllers, etc.).

Figure 2:
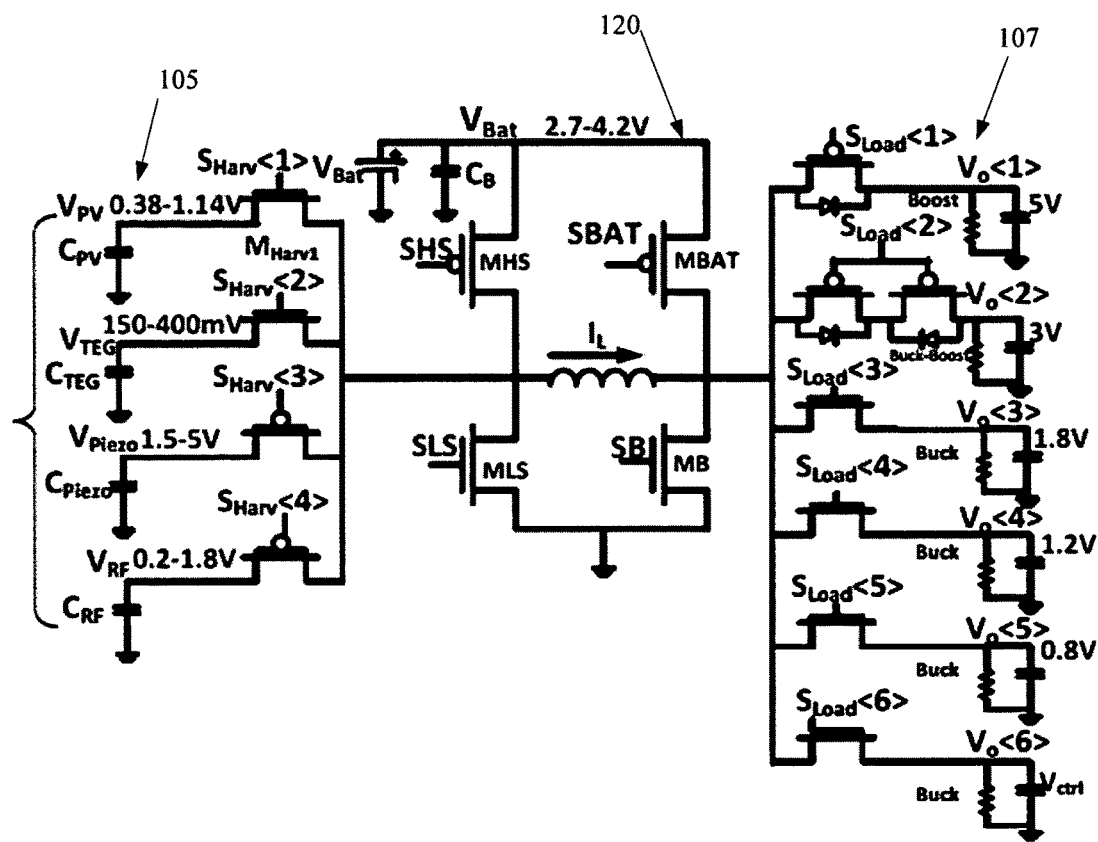
FIG. 2 is a schematic illustrating one embodiment of the MISIMO architecture.

MISIMO 120 includes harvest switches $S_{HARV}[1:4]$, each coupled to a respective source 105, and load switches $S_{LOAD}[1:6]$. Switches SHS, SLS, SBAT and SB are also included, and are coupled to inductor 122. Inductor 122 stores energy received at regulator from energy sources 105 and releases the energy to power loads 107 via the respective voltage rails. FIG. 2 is a schematic illustrating one embodiment of the components shown in FIG. 1. According to one embodiment, the power stage operates in discontinuous conduction mode (DCM).

In a further embodiment, the MISIMO 120 switching cycle includes three phases. Phase 1 is an inductor 122 charging phase where switch SB is always on and SHARV [1:4] switches and switch SHS are time multiplexed, meanwhile the battery switch SBAT and the load switches SLOAD[1:6] are off. In such an embodiment, the ON time for each harvester switch is determined by controller 125, as discussed below. Phase 2 is an inductor discharging phase in which switch SLS is always on and $S_{Load}$ [1:6] and SBAT switches are time multiplexed; switches SHS and SHARV [1:4] remain off during this phase. In Phase 2, the ON time for each load switch is determined by controller 125, and if there are still charges remaining, switch SBAT is opened until zero current is detected at inductor 122. Phase 3 is a free-wheel phase in which inductor 122 current is zero and switches SLS and SB are always on, the remaining switches remain off.

Figure 3:
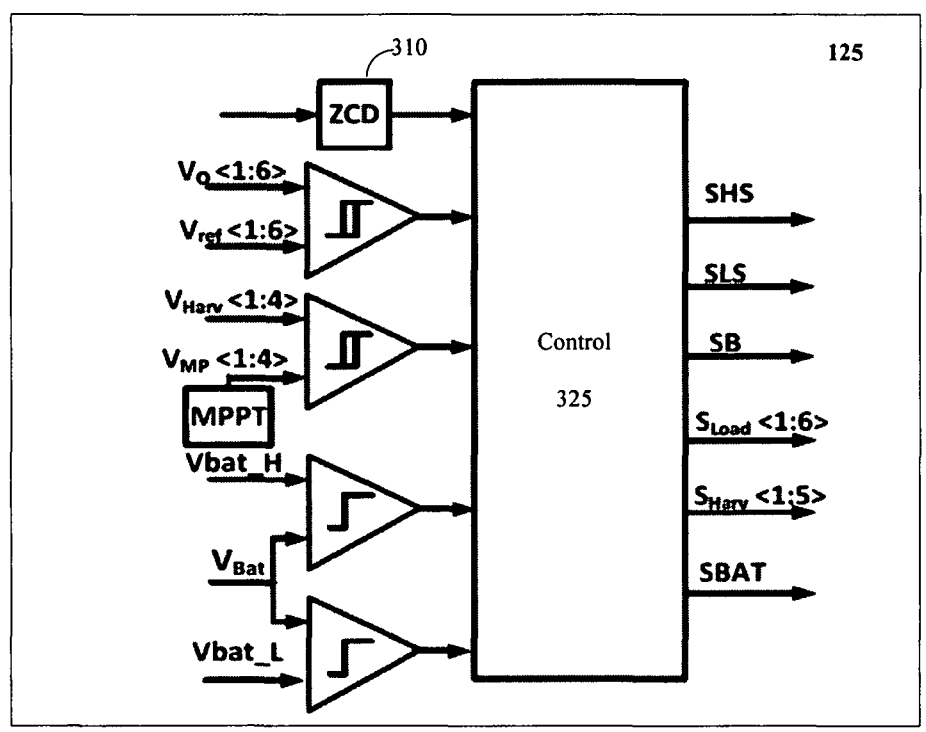
FIG. 3 illustrates one embodiment of a controller.

FIG. 3 illustrates one embodiment of controller 125. Controller 125 includes a zero current detector (ZCD) 310 coupled to a control unit 325. ZCD 310 detects when current is zero at inductor 122. Additionally, control unit 325 is coupled to one comparator per energy source 105, one comparator per voltage rail 106 and two comparators for battery 110. In one embodiment, the comparators are hysteresis (or analog) comparators. However, other embodiments may feature different comparator types.

In one embodiment, the source (or harvester) comparators compare each source voltage to the voltage for maximum power voltage ($V_{MP}$) to control the harvester sources 105 accordingly. Various embodiments may implemented to detect $V_{MP}$. The output (or load) comparators compare each load 107 voltage to a reference voltage to regulate the load accordingly. The battery comparator monitors the battery 110 voltage to avoid overcharging. According to one embodiment, control unit 325 accepts the ZCD signal together with the comparator output signals and controls the power stage switches accordingly.

Figure 4:
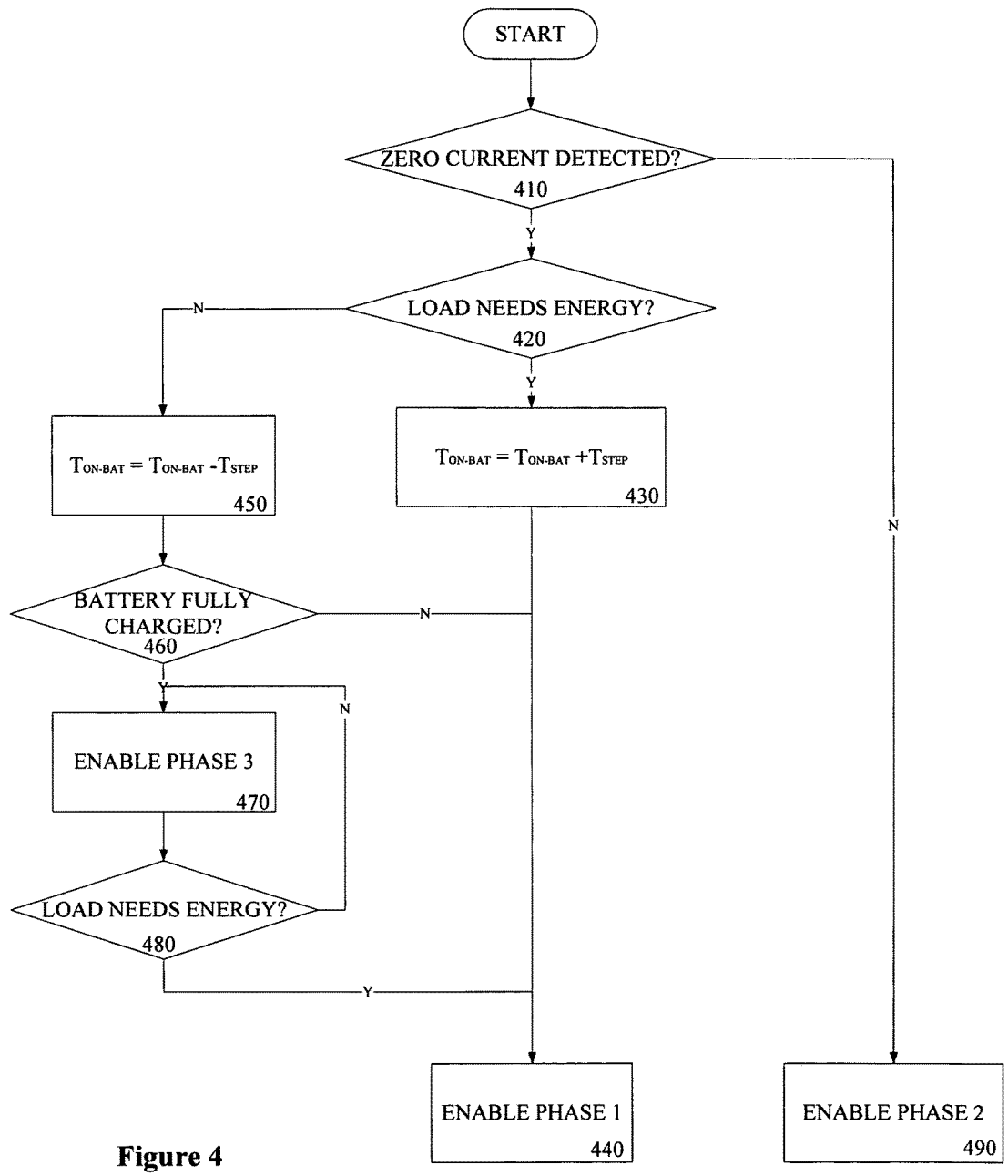
FIG. 4 is a flow diagram illustrating one embodiment of a control process.

FIG. 4 is a flow diagram illustrating one embodiment of a process performed by control unit 325. At decision block 410, a determination is made as to whether zero current is detected at ZCD 310. If so, a determination is made as to whether the load needs energy, decision block 420. If the load comparators indicate that the load still requires energy, energy drawn from the battery is increased in the following cycle by increasing Ton–bat by Tstep (e.g. Ton–bat=Ton–bat,prev+Tstep), processing block 430. Phase 1 is then enabled as a new switching phase, processing block 440.

If at decision block 420 a determination is made that the loads do not need energy, the next energy pulse will be reduced by reducing the ON time (e.g., $T_{ON-BAT}=T_{ON-BAT}-T_{STEP}$). At decision block 460, a determination is made as to whether the battery is fully charged. If not, phase 1 is enabled, where the energy can be drawn from the harvesters. Otherwise, if the battery is fully charged, phase 3 is enabled (processing block 470) until decision block 480 signals that one or more loads signal that charge is required, thus again enabling phase 1 at processing block 440.

At decision block 480, a determination is again made as to whether the load needs energy. If not, control is returned to processing block 470, where control unit 325 remains in Phase 3. Otherwise, Phase 1 is enabled, processing block 440. If at decision block 410 a determination is made that zero current has not been detected, Phase 2 is enabled as a new switching phase, processing block 490.

Figure 5:
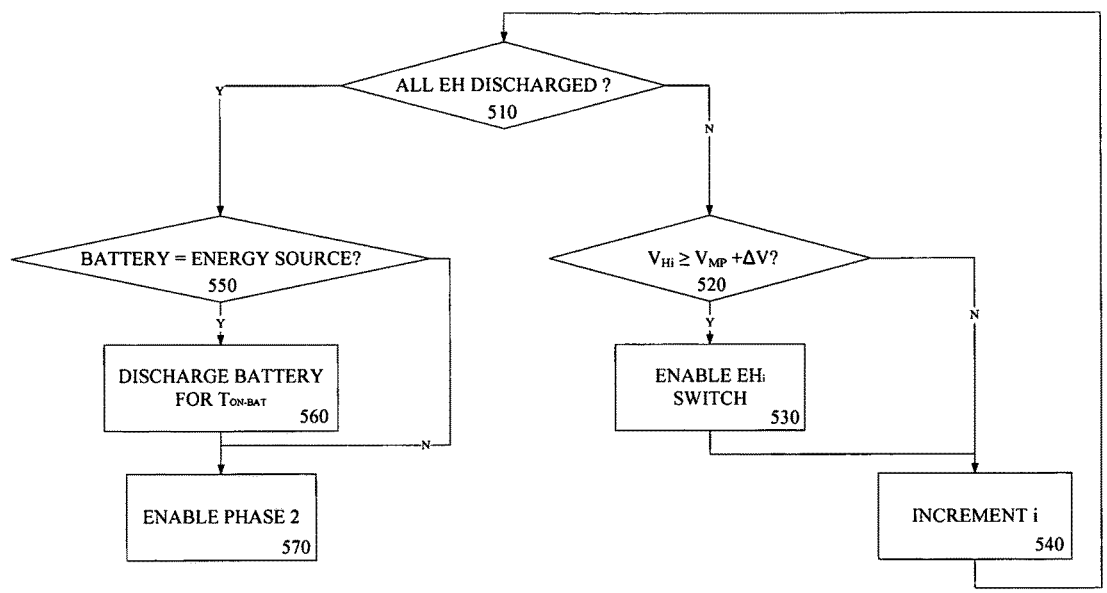
FIG. 5 is a flow diagram illustrating a further embodiment of a control process.

FIG. 5 is a flow diagram illustrating one embodiment of a process performed by control unit 325 when operating in Phase 1. At decision block 510, a determination is made as to whether all energy harvesters have been discharged. If not, a determination is made as to whether the voltage at a harvester ($H_i$) is greater than or equal to the maximum power voltage ($V_{MP}$) plus a voltage change ($\Delta V$), decision block 520. If $V_{Hi}<V_{MP}+\Delta V$, i is incremented, processing block 540, and control is returned to decision block 510 where a determination is again made as to whether all energy harvesters have been discharged.

If at block 520 it is determined that $V_{Hi} \geq V_{MP}+\Delta V$, an energy harvester switch i is enabled to supply power, processing block 530. If enabled, $EH_i$ is monitored until $V_{Hi}<V_{MP}+\Delta V$. Once this condition occurs i is incremented, processing block 540, and control is returned to decision block 510. If at decision block 510 a determination is made that all energy harvesters have been discharged, a determination is made as to whether the battery is the source, decision block 550. If not, Phase 2 is enabled, processing block 570. Otherwise, the battery is used as the power source, processing block 560, prior to entering Phase 2.

Figure 6:
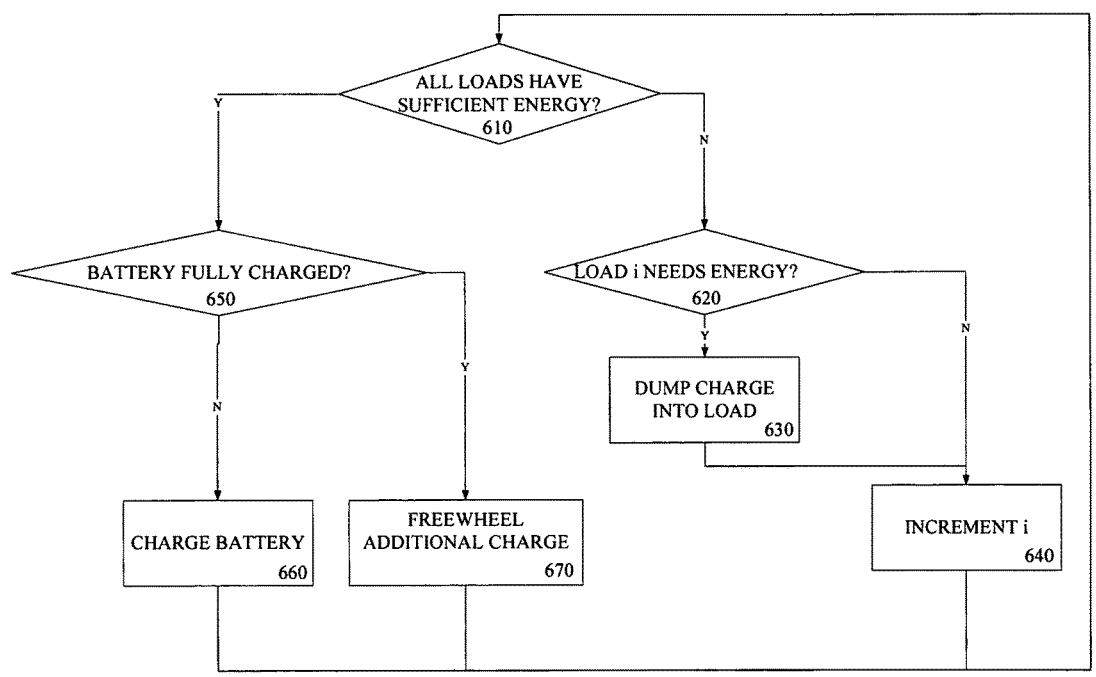
FIG. 6 is a flow diagram illustrating yet a further embodiment of a control process.

FIG. 6 is a flow diagram illustrating one embodiment of a process performed by control unit 325 when operating in Phase 2. At decision block 610, a determination is made as to whether all loads have sufficient energy. If not, a determination is made as to whether a load i needs energy, decision block 620. If load i does not need energy, i is incremented, processing block 640, and control is returned to decision block 610 where a determination is again made as to whether all loads have sufficient energy. If load i needs energy, charge is dumped into the load, processing block 630. Subsequently, i is incremented, processing block 640, and control is returned to decision block 610. If at decision block 610 a determination is made that all loads have sufficient energy, a determination is made as to whether the battery is fully charged, decision block 650. If not, the battery is charged, processing block 660. Otherwise, additional charge is freewheeled into the battery, processing block 670.

Figure 7A:
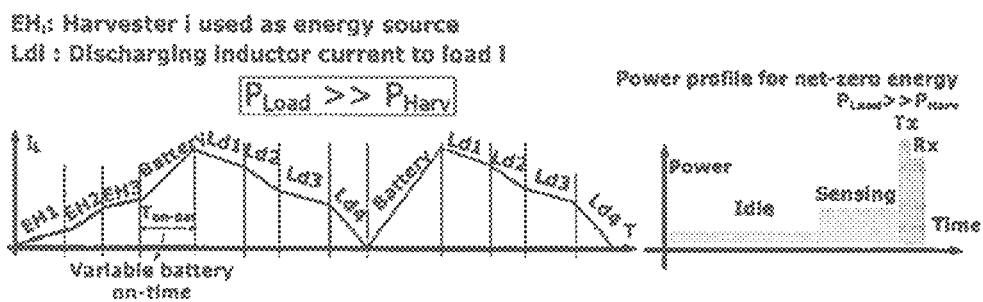
FIGS. 7a-7c illustrate embodiments of controlled inductor current profiles.
Figure 7B:
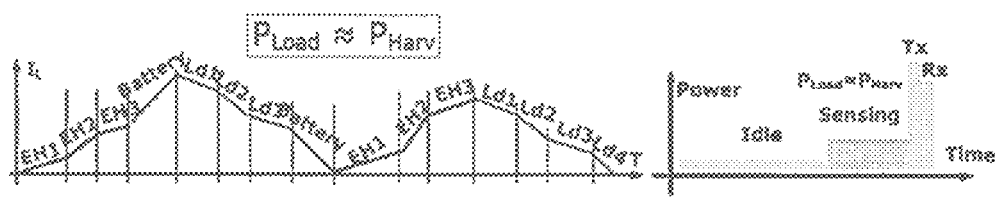
Figure 7C:
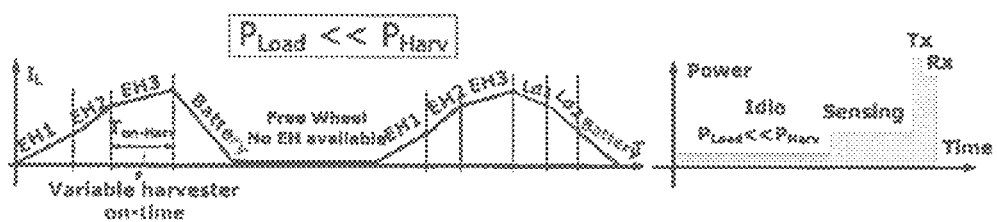

FIGS. 7a-7c illustrate embodiments of the inductor 122 waveform resulting from the processes performed by controller 125. FIG. 7a shows the case where the output load power is much larger than the harvester power ($P_{Load} \gg P_{Harv}$). In this case, all of the energy harvester sources and battery will be used to supply the loads. If no harvester energy (EH) is available, only the battery is used. In one embodiment, the process varies the battery ON-time based on the load condition and varies the harvester ON-time adaptive to the harvester condition to extract the maximum power.

FIG. 7b shows the case where the output load power is approximately equal to the available harvester power ($P_{Load} \approx P_{Harv}$). In this case, there are some switching cycles where harvesters (EH) and battery supply the load or only harvesters supply the load. In all cases, the battery will be charged with any residual current after supplying and satisfying all of the loads. FIG. 7c shows the case where the output load is much lower than the harvester power ($P_{Load} \ll P_{Harv}$). In this case, only the harvesters will be used in the charging phase to charge the battery and supply the loads. The free wheel phase (Phase 3) will be enabled in two cases: if none of the energy harvester can supply energy and all loads are satisfied; and if the battery is fully charged and all loads are satisfied, even if energy from the harvesters is available.

Figure 8:
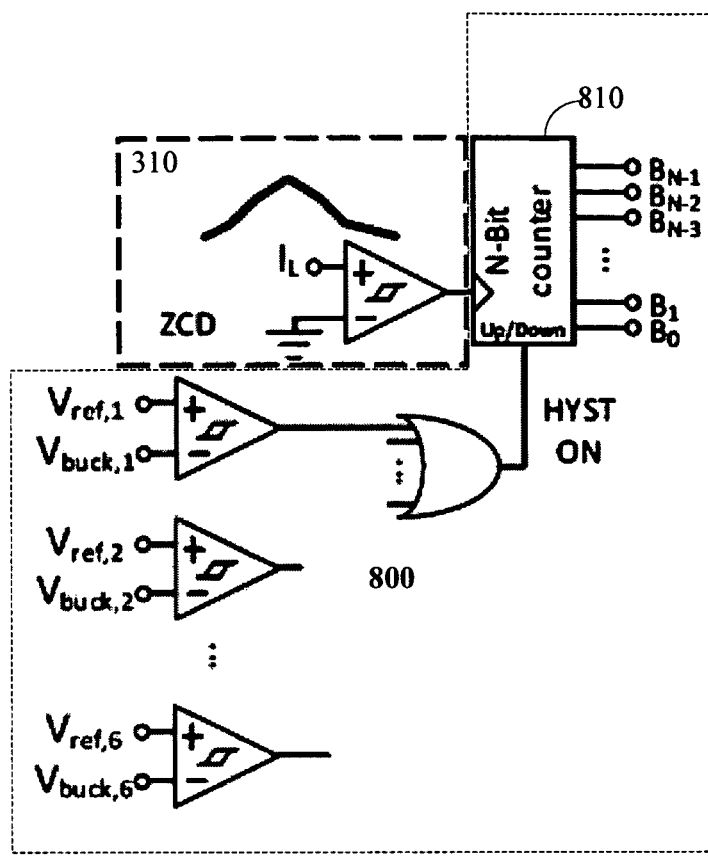
FIG. 8 illustrates another embodiment of a controller.

According to one embodiment, a controller performs an asynchronous, event-based process that enables a wide efficiency range without the need of an internal clock, and uses a scaling scheme to reduce bias power at light loads. FIG. 8 illustrates another embodiment of a controller 800 implemented to perform priority and charge recycling process. In one embodiment, the functionality of controller 800 may be incorporated into controller 125 in MISIMO regulator 120. However, in other embodiments controller 800 may be implemented in a single input single inductor multiple output ((SISIMO) or SIMO)) application.

As shown in FIG. 8, controller 800 includes a counter 810 coupled to ZCD 310 and load comparators. In one embodiment, the comparators constantly sample the output voltages and determine if the output voltages are within, or below, a hysteresis window. Whenever one of the comparators sense an underdroop (e.g., Vout, DC-Vhyst/2), controller 800 enables an energy pulse to restore the output voltage. In such an embodiment, the inductor (e.g., inductor 122) is charged through an Adaptive On-Time generator 810 that generates an energy pulse for a length of time proportional to the stored count value. At the end of a service cycle (e.g., when the inductor current falls to zero), the counter value is increased if one of the comparators is still on (e.g., at least one output did not receive enough charge). Otherwise, the count value will decrease by one bit (time step) if all comparators signal that their respective loads are within range. This results in the succeeding pulse shorter, which avoids excess inductor charge. The counter performs integration (averaging) such that, after settling, the ON time will be enough to satisfy all the loads. Alternative implementations using analog domain implementations are possible but the asynchronous nature of the integrator sampling allows for ultra-low power consumption. In another embodiment, the counter value can be increased by a number proportional to how many comparators remain ON after a service cycle to improve response time and improve voltage droops due to load transients.

Figure 9:
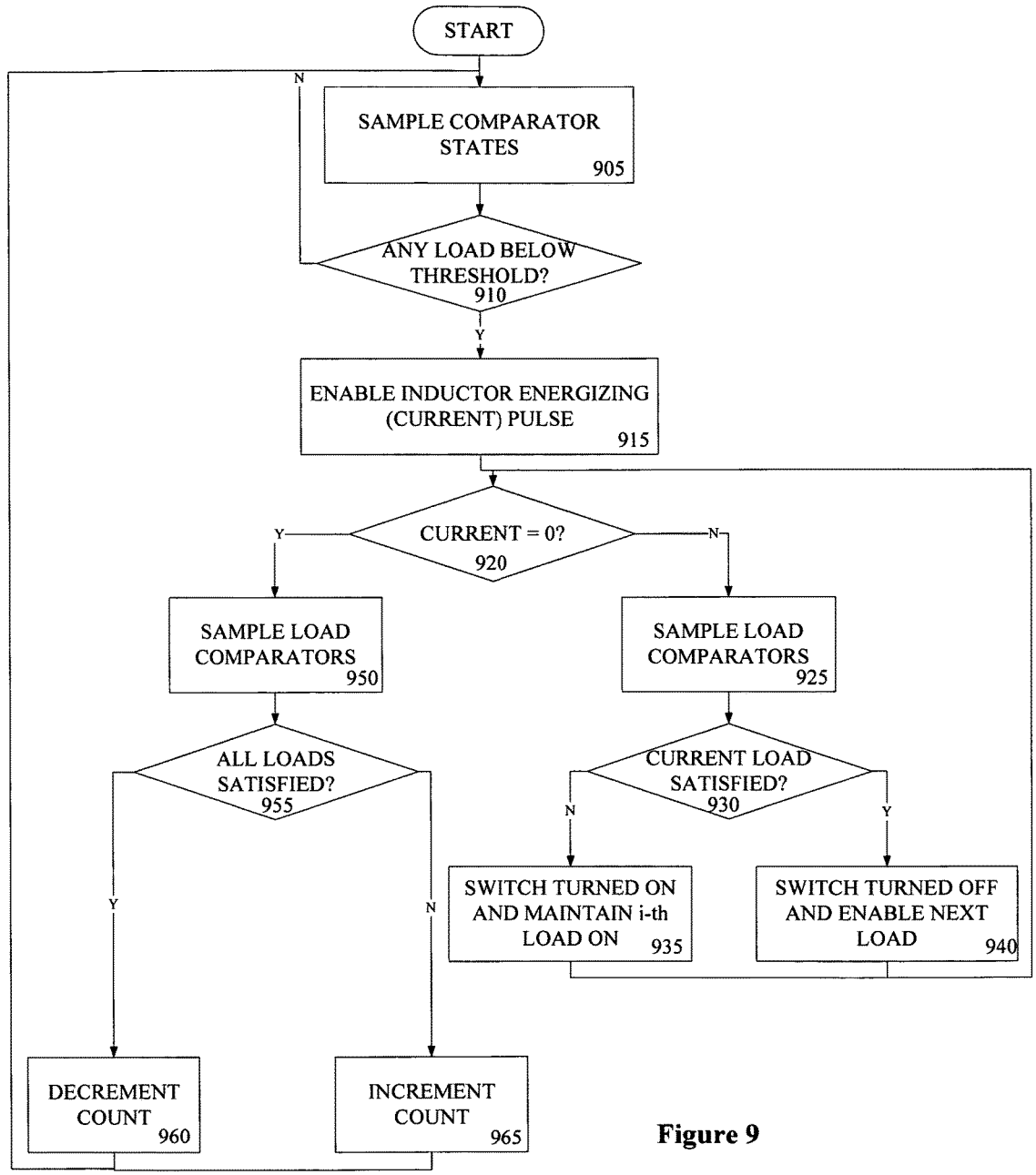
FIG. 9 is a flow diagram illustrating one embodiment of a control process.

FIG. 9 is a flow diagram illustrating one embodiment of a process performed by controller 800. At processing block 905, comparator states are sampled. At decision block 910, a determination is made as to whether any load is below a threshold voltage. If not, control is returned to processing block 905 where comparator rates continue to be sampled. Otherwise, an energy pulse ($T_{ON}$) is enabled, processing block 915.

At decision block 920, a determination is made as to whether the inductor current is zero. If the inductor still has energy (current non-zero), the load comparators are sampled, processing block 925. At decision block 930, a determination is made as to whether the current load is satisfied. If so, the switch is turned on and the current (e.g., i-th load) remains on, processing block 935. Otherwise, the switch is turned off and the next load requiring charging is enabled, processing block 940. After either occurrence, control is returned to decision block 920 where a determination is again made as to whether the inductor current is zero.

If at decision block 920 a determination is made that the inductor current is zero, the load comparators are sampled, processing block 950. At decision block 955, a determination is made as to whether all loads are satisfied. If so, the count is decremented, processing block 960. Otherwise, the count is incremented, processing block 965. After either occurrence, control is returned to processing block 905 where comparator states are again sampled.

A characteristic of controller 800 is that the ON-time of the power stage builds up over time. Although at the beginning of the regulation $T_{ON}$ is small and many cycles may be needed to provide the output enough with enough charge, the outputs are replenished through fewer energy bursts after the settling time of a converter (e.g., while the counter counts up). In other embodiments, there are instances in which more than one pulse is used to satisfy the loads.

Figure 10:
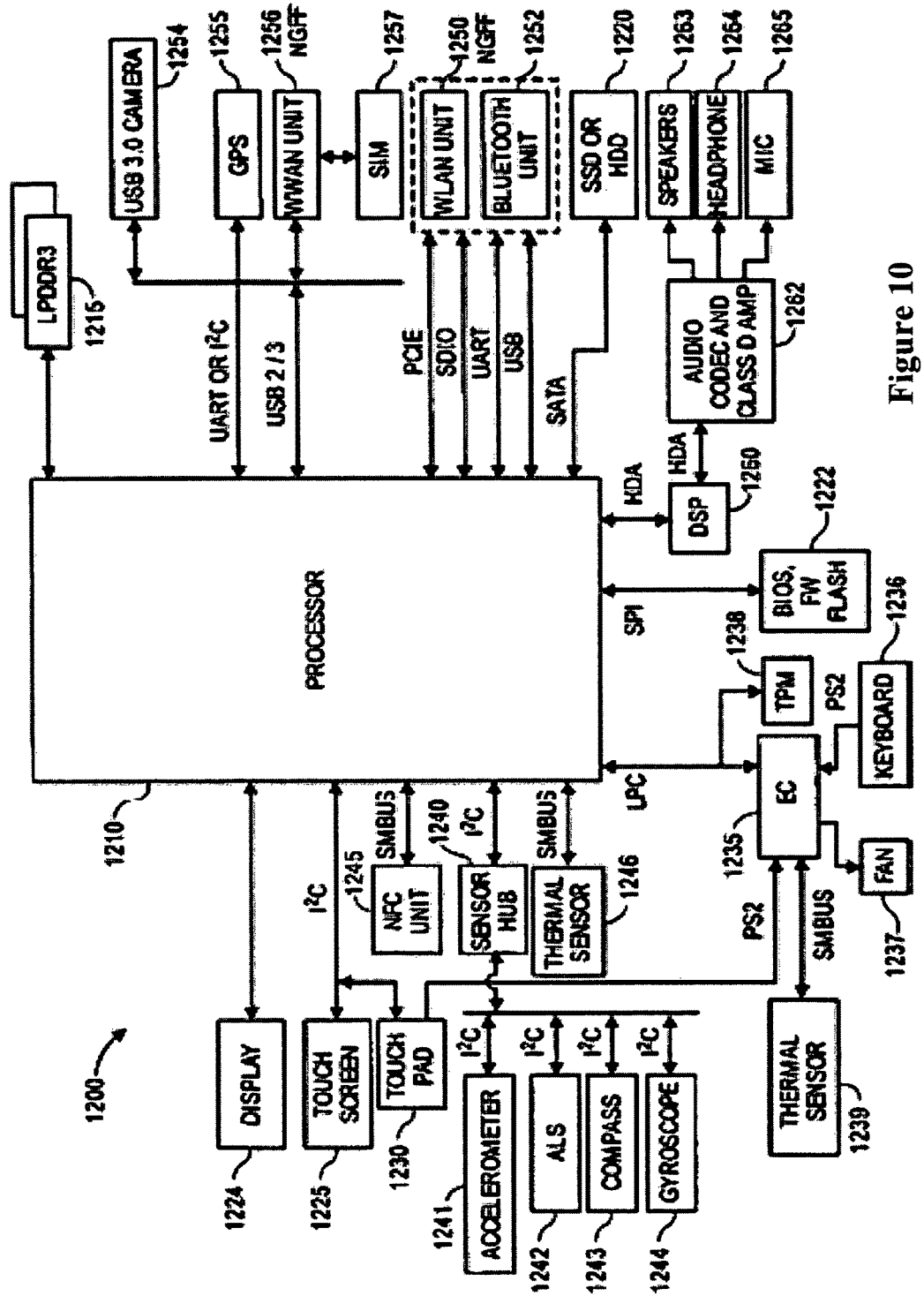
FIG. 10 is a block diagram illustrating one embodiment of a computer system.

FIG. 10 is a block diagram illustrating one embodiment of a computer system in which the above-described mechanism may be implemented. As shown in FIG. 10, system 1200 includes any combination of components. These components may be implemented as ICs, portions thereof, discrete electronic devices, or other modules, logic, hardware, software, firmware, or a combination thereof adapted in a computer system, or as components otherwise incorporated within a chassis of the computer system. Note also that the block diagram of FIG. 10 is intended to show a high level view of many components of the computer system. However, it is to be understood that some of the components shown may be omitted, additional components may be present, and different arrangement of the components shown may occur in other implementations. As a result, the disclosure described above may be implemented in any portion of one or more of the interconnects illustrated or described below.

As seen in FIG. 10, a processor 1210, in one embodiment, includes a microprocessor, multi-core processor, multi-threaded processor, an ultra low voltage processor, an embedded processor, or other known processing element. In the illustrated implementation, processor 1210 acts as a main processing unit and central hub for communication with many of the various components of the system 1200. As one example, processor 1200 is implemented as a system on a chip (SoC). As a specific illustrative example, processor 1210 includes an Intel® Architecture Core™-based processor such as an i3, i5, i7 or another such processor available from Intel Corporation, Santa Clara, Calif. However, other low power processors such as those available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters may instead be present in other embodiments such as an Apple A5/A6 processor, a Qualcomm Snapdragon processor, or Ti OMAP processor. Note that many of the customer versions of such processors are modified and varied; however, they may support or recognize a specific instructions set that performs defined algorithms as set forth by the processor licensor. Here, the microarchitecture implementation may vary, but the architectural function of the processor is usually consistent. Certain details regarding the architecture and operation of processor 1210 in one implementation will be discussed further below to provide an illustrative example.

Processor 1210, in one embodiment, communicates with a system memory 1215. As an illustrative example, which in an embodiment can be implemented via multiple memory devices to provide for a given amount of system memory. As examples, the memory can be in accordance with a Joint Electron Devices Engineering Council (JEDEC) low power double data rate (LPDDR)-based design such as the current LPDDR2 standard according to JEDEC JESD 209-2E (published April 13009), or a next generation LPDDR standard to be referred to as LPDDR3 or LPDDR4 that will offer extensions to LPDDR2 to increase bandwidth. In various implementations the individual memory devices may be of different package types such as single die package (SDP), dual die package (DDP) or quad die package (Q17P). These devices, in some embodiments, are directly soldered onto a motherboard to provide a lower profile solution, while in other embodiments the devices are configured as one or more memory modules that in turn couple to the motherboard by a given connector. Other embodiments may feature other memory Implementations, such as other types of memory modules, e.g., dual inline memory modules (DIMMs) of different varieties including but not limited to microDIMMs, MiniDIMMs. In a particular illustrative embodiment, memory is sized between 2 GB and 16 GB, and may be configured as a DDR3LM package or an LPDDR2 or LPDDR3 memory that is soldered onto a motherboard via a ball grid array (BGA).

To provide for persistent storage of information such as data, applications, one or more operating systems and so forth, a mass storage 1220 may also couple to processor 1210. In various embodiments, to enable a thinner and lighter system design as well as to improve system responsiveness, this mass storage may be implemented via a SSD. However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also shown in FIG. 10, a flash device 122 may be coupled to processor 1210, e.g., via a serial peripheral interface (SPI). This flash device may provide for non-volatile storage of system software, including a basic input/output software (BIOS) as well as other firmware of the system.

In various embodiments, mass storage of the system is implemented by a SSD alone or as a disk, optical or other drive with an SSD cache. In some embodiments, the mass storage is implemented as a SSD or as a HDD along with a restore (RST) cache module. In various implementations, the HDD provides for storage of between 320 GB-4 terabytes (TB) and upward while the RST cache is implemented with a SSD having a capacity of 24 GB-256 GB. Note that such SSD cache may be configured as a single level cache (SLC) or multi-level cache (MLC) option to provide an appropriate level of responsiveness. In a SSD-only option, the module may be accommodated in various locations such as in a mSATA or NGFF slot. As an example, an SSD has a capacity ranging from 120 GB-1 TB.

Various input/output (IO) devices may be present within system 1200. Specifically shown in the embodiment of FIG. 10 is a display 1224, which may be a high definition LCD or LED panel configured within a lid portion of the chassis. This display panel may also provide for a touch screen 1225, e.g., adapted externally over the display panel such that via a user's interaction with this touch screen, user inputs can be provided to the system to enable desired operations, e.g., with regard to the display of information, accessing of information and so forth. In one embodiment, display 1224 may be coupled to processor 1210 via a display interconnect that can be implemented as a high performance graphics interconnect. Touch screen 1225 may be coupled to processor 1210 via another interconnect, which in an embodiment can be an I2C interconnect. As further shown in FIG. 10, in addition to touch screen 1225, user input by way of touch can also occur via a touch pad 1230 which may be configured within the chassis and may also be coupled to the same I2C interconnect as touch screen 1225.

The display panel may operate in multiple modes. In a first mode, the display panel can be arranged in a transparent state in which the display panel is transparent to visible light. In various embodiments, the majority of the display panel may be a display except for a bezel around the periphery. When the system is operated in a notebook mode and the display panel is operated in a transparent state, a user may view information that is presented on the display panel while also being able to view objects behind the display. In addition, information displayed on the display panel may be viewed by a user positioned behind the display. Or the operating state of the display panel can be an opaque state in which visible light does not transmit through the display panel.

In a tablet mode the system is folded shut such that the back display surface of the display panel comes to rest in a position such that it faces outwardly towards a user, when the bottom surface of the base panel is rested on a surface or held by the user. In the tablet mode of operation, the back display surface performs the role of a display and user interface, as this surface may have touch screen functionality and may perform other known functions of a conventional touch screen device, such as a tablet device. To this end, the display panel may include a transparency adjusting layer that is disposed between a touch screen layer and a front display surface. In some embodiments the transparency-adjusting layer may be an electrochromic layer (EC), a LCD layer, or a combination of EC and LCD layers.

In various embodiments, the display can be of different sizes, e.g., an 11.6" or a 13.3" screen, and may have a 16:9 aspect ratio, and at least 300 nits brightness. Also the display may be of full high definition (HD) resolution (at least 1920×1080p), be compatible with an embedded display port (eDP), and be a low power panel with panel self refresh.

As to touch screen capabilities, the system may provide for a display multitouch panel that is multi-touch capacitive and being at least 5 finger capable. And in some embodiments, the display may be 10 finger capable. In one embodiment, the touch screen is accommodated within a damage and scratch resistant glass and coating (e.g., Gorilla Glass™ or Gorilla Glass 2™) for low friction to reduce "finger burn" and avoid "finger skipping". To provide for an enhanced touch experience and responsiveness, the touch panel, in some implementations, has multi-touch functionality, such as less than 2 frames (30 Hz) per static view during pinch zoom, and single-touch functionality of less than 1 cm per frame (30 Hz) with 1300 ms (lag on finger to pointer). The display, in some implementations, supports edge-to-edge glass with a minimal screen bezel that is also flush with the panel surface, and limited IO interference when using multi touch.

For perceptual computing and other purposes, various sensors may be present within the system and may be coupled to processor 1210 in different manners. Certain inertial and environmental sensors may couple to processor 1210 through a sensor hub 1240, e.g., via an I2C interconnect. In the embodiment shown in FIG. 10, these sensors may include an accelerometer 1241, an ambient light sensor (ALS) 142, a compass 1243 and a gyroscope 1244. Other environmental sensors may include one or more thermal sensors 1246, which in some embodiments couple to processor 1210 via a system management bus (SMBus) bus.

Using the various inertial and environmental sensors present in a platform, many different use cases may be realized. These use cases enable advanced computing operations including perceptual computing and also allow for enhancements with regard to power management/battery life, security, and system responsiveness.

For example with regard to power management/battery life issues, based at least on part on information from an ambient light sensor, the ambient light conditions in a location of the platform are determined and intensity of the display controlled accordingly. Thus, power consumed in operating the display is reduced in certain light conditions.

As to security operations, based on context information obtained from the sensors such as location information, it may be determined whether a user is allowed to access certain secure documents. For example, a user may be permitted to access such documents at a work place or a home location. However, the user is prevented from accessing such documents when the platform is present at a public location. This determination, in one embodiment, is based on location information, e.g., determined via a GPS sensor or camera recognition of landmarks. Other security operations may include providing for pairing of devices within a close range of each other, e.g., a portable platform as described herein and a user's desktop computer, mobile telephone or so forth. Certain sharing, in some implementations, are realized via near field communication when these devices are so paired. However, when the devices exceed a certain range, such sharing may be disabled. Furthermore, when pairing a platform as described herein and a smartphone, an alarm may be configured to be triggered when the devices move more than a predetermined distance from each other, when in a public location. In contrast, when these paired devices are in a safe location, e.g., a work place or home location, the devices may exceed this predetermined limit without triggering such alarm.

Responsiveness may also be enhanced using the sensor information. For example, even when a platform is in a low power state, the sensors may still be enabled to run at a relatively low frequency. Accordingly, any changes in a location of the platform, e.g., as determined by inertial sensors, GPS sensor, or so forth is determined. If no such changes have been registered, a faster connection to a previous wireless hub such as a Wi-Fi™ access point or similar wireless enabler occurs, as there is no need to scan for available wireless network resources in this case. Thus, a greater level of responsiveness when waking from a low power state is achieved.

It is to be understood that many other use cases may be enabled using sensor information obtained via the integrated sensors within a platform as described herein, and the above examples are only for purposes of illustration. Using a system as described herein, a perceptual computing system may allow for the addition of alternative input modalities, including gesture recognition, and enable the system to sense user operations and intent.

In some embodiments one or more infrared or other heat sensing elements, or any other element for sensing the presence or movement of a user may be present. Such sensing elements may include multiple different elements working together, working in sequence, or both. For example, sensing elements include elements that provide initial sensing, such as light or sound projection, followed by sensing for gesture detection by, for example, an ultrasonic time of flight camera or a patterned light camera.

Also in some embodiments, the system includes a light generator to produce an illuminated line. In some embodiments, this line provides a visual cue regarding a virtual boundary, namely an imaginary or virtual location in space, where action of the user to pass or break through the virtual boundary or plane is interpreted as an intent to engage with the computing system. In some embodiments, the illuminated line may change colors as the computing system transitions into different states with regard to the user. The illuminated line may be used to provide a visual cue for the user of a virtual boundary in space, and may be used by the system to determine transitions in state of the computer with regard to the user, including determining when the user wishes to engage with the computer.

In some embodiments, the computer senses user position and operates to interpret the movement of a hand of the user through the virtual boundary as a gesture indicating an intention of the user to engage with the computer. In some embodiments, upon the user passing through the virtual line or plane the light generated by the light generator may change, thereby providing visual feedback to the user that the user has entered an area for providing gestures to provide input to the computer.

Display screens may provide visual indications of transitions of state of the computing system with regard to a user. In some embodiments, a first screen is provided in a first state in which the presence of a user is sensed by the system, such as through use of one or more of the sensing elements.

In some implementations, the system acts to sense user identity, such as by facial recognition. Here, transition to a second screen may be provided in a second state, in which the computing system has recognized the user identity, where this second the screen provides visual feedback to the user that the user has transitioned into a new state. Transition to a third screen may occur in a third state in which the user has confirmed recognition of the user.

In some embodiments, the computing system may use a transition mechanism to determine a location of a virtual boundary for a user, where the location of the virtual boundary may vary with user and context. The computing system may generate a light, such as an illuminated line, to indicate the virtual boundary for engaging with the system. In some embodiments, the computing system may be in a waiting state, and the light may be produced in a first color. The computing system may detect whether the user has reached past the virtual boundary, such as by sensing the presence and movement of the user using sensing elements.

In some embodiments, if the user has been detected as having crossed the virtual boundary (such as the hands of the user being closer to the computing system than the virtual boundary line), the computing system may transition to a state for receiving gesture inputs from the user, where a mechanism to indicate the transition may include the light indicating the virtual boundary changing to a second color.

In some embodiments, the computing system may then determine whether gesture movement is detected. If gesture movement is detected, the computing system may proceed with a gesture recognition process, which may include the use of data from a gesture data library, which may reside in memory in the computing device or may be otherwise accessed by the computing device.

If a gesture of the user is recognized, the computing system may perform a function in response to the input, and return to receive additional gestures if the user is within the virtual boundary. In some embodiments, if the gesture is not recognized, the computing system may transition into an error state, where a mechanism to indicate the error state may include the light indicating the virtual boundary changing to a third color, with the system returning to receive additional gestures if the user is within the virtual boundary for engaging with the computing system.

As mentioned above, in other embodiments the system can be configured as a convertible tablet system that can be used in at least two different modes, a tablet mode and a notebook mode. The convertible system may have two panels, namely a display panel and a base panel such that in the tablet mode the two panels are disposed in a stack on top of one another. In the tablet mode, the display panel faces outwardly and may provide touch screen functionality as found in conventional tablets. In the notebook mode, the two panels may be arranged in an open clamshell configuration.

In various embodiments, the accelerometer may be a 3-axis accelerometer having data rates of at least 50 Hz. A gyroscope may also be included, which can be a 3-axis gyroscope. In addition, an e-compass/magnetometer may be present. Also, one or more proximity sensors may be provided (e.g., for lid open to sense when a person is in proximity (or not) to the system and adjust power/performance to extend battery life). For some OS's Sensor Fusion capability including the accelerometer, gyroscope, and compass may provide enhanced features. In addition, via a sensor hub having a real-time clock (RTC), a wake from sensors mechanism may be realized to receive sensor input when a remainder of the system is in a low power state.

In some embodiments, an internal lid/display open switch or sensor to indicate when the lid is closed/open, and can be used to place the system into Connected Standby or automatically wake from Connected Standby state. Other system sensors can include ACPI sensors for internal processor, memory, and skin temperature monitoring to enable changes to processor and system operating states based on sensed parameters.

In an embodiment, the OS may be a Microsoft® Windows® 8 OS that implements Connected Standby (also referred to herein as Win8 CS). Windows 8 Connected Standby or another OS having a similar state can provide, via a platform as described herein, very low ultra idle power to enable applications to remain connected, e.g., to a cloud-based location, at very low power consumption. The platform can supports 3 power states, namely screen on (normal); Connected Standby (as a default "off" state); and shutdown (zero watts of power consumption). Thus in the Connected Standby state, the platform is logically on (at minimal power levels) even though the screen is off. In such a platform, power management can be made to be transparent to applications and maintain constant connectivity, in part due to offload technology to enable the lowest powered component to perform an operation.

Also seen in FIG. 10, various peripheral devices may couple to processor 1210 via a low pin count (LPC) interconnect. In the embodiment shown, various components can be coupled through an embedded controller 1235. Such components can include a keyboard 1236 (e.g., coupled via a PS2 interface), a fan 1237, and a thermal sensor 1239. In some embodiments, touch pad 1230 may also couple to EC 1235 via a PS2 interface. In addition, a security processor such as a trusted platform module (TPM) 1238 in accordance with the Trusted Computing Group (TCG) TPM Specification Version 1.2, dated Oct. 2, 13003, may also couple to processor 1210 via this LPC interconnect. However, understand the scope of the present disclosure is not limited in this regard and secure processing and storage of secure information may be in another protected location such as a static random access memory (SRAM) in a security coprocessor, or as encrypted data blobs that are only decrypted when protected by a secure enclave (SE) processor mode.

In a particular implementation, peripheral ports may include a high definition media interface (HDMI) connector (which can be of different form factors such as full size, mini or micro); one or more USB ports, such as full-size external ports in accordance with the Universal Serial Bus (USB) Revision 3.0 Specification (November 13008), with at least one powered for charging of USB devices (such as smartphones) when the system is in Connected Standby state and is plugged into AC wall power. In addition, one or more Thunderbolt™ ports can be provided. Other ports may include an externally accessible card reader such as a full size SD-XC card reader and/or a SIM card reader for WWAN (e.g., an 8 pin card reader). For audio, a 3.5 mm jack with stereo sound and microphone capability (e.g., combination functionality) can be present, with support for jack detection (e.g., headphone only support using microphone in the lid or headphone with microphone in cable). In some embodiments, this jack can be re-taskable between stereo headphone and stereo microphone input. Also, a power jack can be provided for coupling to an AC brick.

System 1200 can communicate with external devices in a variety of manners, including wirelessly. In the embodiment shown in FIG. 10, various wireless modules, each of which can correspond to a radio configured for a particular wireless communication protocol, are present. One manner for wireless communication in a short range such as a near field may be via a near field communication (NFC) unit 1245 which may communicate, in one embodiment with processor 1210 via an SMBus. Note that via this NFC unit 1245, devices in close proximity to each other can communicate. For example, a user can enable system 1200 to communicate with another (e.g.,) portable device such as a smartphone of the user via adapting the two devices together in close relation and enabling transfer of information such as identification information payment information, data such as image data or so forth. Wireless power transfer may also be performed using a NFC system.

Using the NFC unit described herein, users can bump devices side-to-side and place devices side-by-side for near field coupling functions (such as near field communication and wireless power transfer (WPT)) by leveraging the coupling between coils of one or more of such devices. More specifically, embodiments provide devices with strategically shaped, and placed, ferrite materials, to provide for better coupling of the coils. Each coil has an inductance associated with it, which can be chosen in conjunction with the resistive, capacitive, and other features of the system to enable a common resonant frequency for the system.

As further seen in FIG. 10, additional wireless units can include other short range wireless engines including a WLAN unit 1250 and a Bluetooth unit 1252. Using WLAN unit 1250, Wi-Fi™ communications in accordance with a given Institute of Electrical and Electronics Engineers (IEEE) 802.11 standard can be realized, while via Bluetooth unit 1252, short range communications via a Bluetooth protocol can occur. These units may communicate with processor 1210 via, e.g., a USB link or a universal asynchronous receiver transmitter (UART) link. Or these units may couple to processor 1210 via an interconnect according to a Peripheral Component Interconnect Express™ (PCIe™) protocol, e.g., in accordance with the PCI Express™ Specification Base Specification version 3.0 (published Jan. 17, 13007), or another such protocol such as a serial data input/output (SDIO) standard. Of course, the actual physical connection between these peripheral devices, which may be configured on one or more add-in cards, can be by way of the NGFF connectors adapted to a motherboard.

In addition, wireless wide area communications, e.g., according to a cellular or other wireless wide area protocol, can occur via a WWAN unit 1256 which in turn may couple to a subscriber identity module (SIM) 1257. In addition, to enable receipt and use of location information, a GPS module 1255 may also be present. Note that in the embodiment shown in FIG. 10, WWAN unit 1256 and an integrated capture device such as a camera module 1254 may communicate via a given USB protocol such as a USB 2.0 or 3.0 link, or a UART or I2C protocol. Again the actual physical connection of these units can be via adaptation of a NGFF add-in card to an NGFF connector configured on the motherboard.

In a particular embodiment, wireless functionality can be provided modularly, e.g., with a WiFi™ 802.11ac solution (e.g., add-in card that is backward compatible with IEEE 802.11abgn) with support for Windows 8 CS. This card can be configured in an internal slot (e.g., via an NGFF adapter). An additional module may provide for Bluetooth capability (e.g., Bluetooth 4.0 with backwards compatibility) as well as Intel® Wireless Display functionality. In addition NFC support may be provided via a separate device or multi-function device, and can be positioned as an example, in a front right portion of the chassis for easy access. A still additional module may be a WWAN device that can provide support for 3G/4G/LTE and GPS. This module can be implemented in an internal (e.g., NGFF) slot. Integrated antenna support can be provided for WiFi™, Bluetooth, WWAN, NFC and GPS, enabling seamless transition from WiFi™ to WWAN radios, wireless gigabit (WiGig) in accordance with the Wireless Gigabit Specification (July 2010), and vice versa.

As described above, an integrated camera can be incorporated in the lid. As one example, this camera can be a high resolution camera, e.g., having a resolution of at least 2.0 megapixels (MP) and extending to 6.0 MP and beyond.

To provide for audio inputs and outputs, an audio processor can be implemented via a digital signal processor (DSP) 1260, which may couple to processor 1210 via a high definition audio (HDA) link. Similarly, DSP 1260 may communicate with an integrated coder/decoder (CODEC) and amplifier 1262 that in turn may couple to output speakers 1263 which may be implemented within the chassis. Similarly, amplifier and CODEC 1262 can be coupled to receive audio inputs from a microphone 1265, which in an embodiment can be implemented via dual array microphones (such as a digital microphone array) to provide for high quality audio inputs to enable voice-activated control of various operations within the system. Note also that audio outputs can be provided from amplifier/CODEC 1262 to a headphone jack 1264. Although shown with these particular components in the embodiment of FIG. 10, understand the scope of the present disclosure is not limited in this regard.

In a particular embodiment, the digital audio codec and amplifier are capable of driving the stereo headphone jack, stereo microphone jack, an internal microphone array and stereo speakers. In different implementations, the codec can be integrated into an audio DSP or coupled via an HD audio path to a peripheral controller hub (PCH). In some implementations, in addition to integrated stereo speakers, one or more bass speakers can be provided, and the speaker solution can support DTS audio.

In some embodiments, processor 1210 may be powered by an external voltage regulator (VR) and multiple internal voltage regulators that are integrated inside the processor die, referred to as fully integrated voltage regulators (FIVRs). The use of multiple FIVRs in the processor enables the grouping of components into separate power planes, such that power is regulated and supplied by the FIVR to only those components in the group. During power management, a given power plane of one FIVR may be powered down or off when the processor is placed into a certain low power state, while another power plane of another FIVR remains active, or fully powered.

In one embodiment, a sustain power plane can be used during some deep sleep states to power on the I/O pins for several I/O signals, such as the interface between the processor and a PCH, the interface with the external VR and the interface with EC 1235. This sustain power plane also powers an on-die voltage regulator that supports the on-board SRAM or other cache memory in which the processor context is stored during the sleep state. The sustain power plane is also used to power on the processor's wakeup logic that monitors and processes the various wakeup source signals.

During power management, while other power planes are powered down or off when the processor enters certain deep sleep states, the sustain power plane remains powered on to support the above-referenced components. However, this can lead to unnecessary power consumption or dissipation when those components are not needed. To this end, embodiments may provide a connected standby sleep state to maintain processor context using a dedicated power plane. In one embodiment, the connected standby sleep state facilitates processor wakeup using resources of a PCH which itself may be present in a package with the processor. In one embodiment, the connected standby sleep state facilitates sustaining processor architectural functions in the PCH until processor wakeup, this enabling turning off all of the unnecessary processor components that were previously left powered on during deep sleep states, including turning off all of the clocks. In one embodiment, the PCH contains a time stamp counter (TSC) and connected standby logic for controlling the system during the connected standby state. The integrated voltage regulator for the sustain power plane may reside on the PCH as well.

In an embodiment, during the connected standby state, an integrated voltage regulator may function as a dedicated power plane that remains powered on to support the dedicated cache memory in which the processor context is stored such as critical state variables when the processor enters the deep sleep states and connected standby state. This critical state may include state variables associated with the architectural, micro-architectural, debug state, and/or similar state variables associated with the processor.

The wakeup source signals from EC 1235 may be sent to the PCH instead of the processor during the connected standby state so that the PCH can manage the wakeup processing instead of the processor. In addition, the TSC is maintained in the PCH to facilitate sustaining processor architectural functions. Although shown with these particular components in the embodiment of FIG. 10, understand the scope of the present disclosure is not limited in this regard.

Power control in the processor can lead to enhanced power savings. For example, power can be dynamically allocate between cores, individual cores can change frequency/voltage, and multiple deep low power states can be provided to enable very low power consumption. In addition, dynamic control of the cores or independent core portions can provide for reduced power consumption by powering off components when they are not being used.

Some implementations may provide a specific power management IC (PMIC) to control platform power. Using this solution, a system may see very low (e.g., less than 5%) battery degradation over an extended duration (e.g., 16 hours) when in a given standby state, such as when in a Win8 Connected Standby state. In a Win8 idle state a battery life exceeding, e.g., 9 hours may be realized (e.g., at 150 nits). As to video playback, a long battery life can be realized, e.g., full HD video playback can occur for a minimum of 6 hours. A platform in one implementation may have an energy capacity of, e.g., 35 watt hours (Whr) for a Win8 CS using an SSD and (e.g.,) 40-44 Whr for Win8 CS using an HDD with a RST cache configuration.

A particular implementation may provide support for 15 W nominal CPU thermal design power (TDP), with a configurable CPU TDP of up to approximately 25 W TDP design point. The platform may include minimal vents owing to the thermal features described above. In addition, the platform is pillow-friendly (in that no hot air is blowing at the user). Different maximum temperature points can be realized depending on the chassis material. In one implementation of a plastic chassis (at least having to lid or base portion of plastic), the maximum operating temperature can be 52 degrees Celsius (C.). And for an implementation of a metal chassis, the maximum operating temperature can be 46° C.

In different implementations, a security module such as a TPM can be integrated into a processor or can be a discrete device such as a TPM 2.0 device. With an integrated security module, also referred to as Platform Trust Technology (PTT), BIOS/firmware can be enabled to expose certain hardware features for certain security features, including secure instructions, secure boot, Intel® Anti-Theft Technology, Intel® Identity Protection Technology, Intel® Trusted Execution Technology (TXT), and Intel® Manageability Engine Technology along with secure user interfaces such as a secure keyboard and display.

Figure 11:
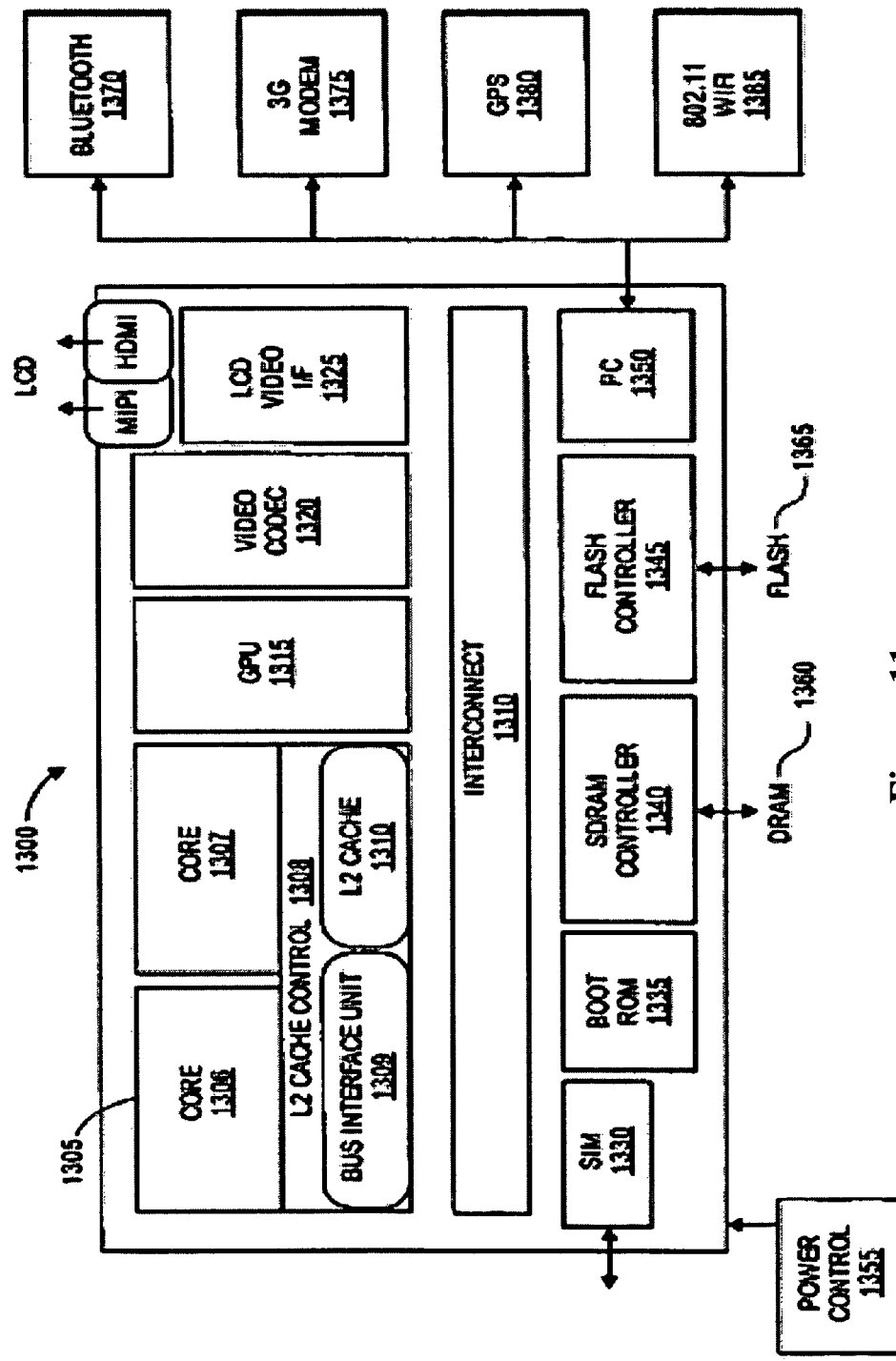
FIG. 11 is a block diagram illustrating another embodiment of a computer system.

Turning next to FIG. 11, another block diagram for an example computing system in accordance with certain embodiments is shown. As a specific illustrative example, SoC 1300 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SoC 1300 includes 2 cores-1306 and 1307. Similar to the discussion above, cores 1306 and 1307 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 1306 and 1307 are coupled to cache control 1308 that is associated with bus interface unit 1309 and L2 cache 1310 to communicate with other parts of system 1300. Interconnect 1310 includes an on-chip interconnect, such as an IOSF, AMBA, or other interconnect discussed above, which potentially implements one or more aspects of the described disclosure.

Interface 1310 provides communication channels to the other components, such as a Subscriber Identity Module (SIM) 1330 to interface with a SIM card, a boot rom 1335 to hold boot code for execution by cores 1306 and 1307 to initialize and boot SoC 1300, a SDRAM controller 1340 to interface with external memory (e.g. DRAM 1360), a flash controller 1345 to interface with non-volatile memory (e.g. Flash 1365), a peripheral control Q1650 (e.g. Serial Peripheral Interface) to interface with peripherals, video codecs 1320 and Video interface 1325 to display and receive input (e.g. touch enabled input), GPU 1315 to perform graphics related computations, etc. Any of these interfaces may incorporate aspects of the disclosure described herein.

In addition, the system illustrates peripherals for communication, such as a Bluetooth module 1370, 3G modem 1375, GPS 1380, and WiFi 1385. Note as stated above, a UE includes a radio for communication. As a result, these peripheral communication modules are not all required. However, in a UE some form of a radio for external communication is to be included.

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to performs acts of the method, or of an apparatus or system for facilitating hybrid communication according to embodiments and examples described herein.

Some embodiments pertain to Example 1 that includes a power regulator comprising a plurality of harvester switches, each coupled to receive a separate energy source, a plurality of load switches, each coupled to supply power to a separate load, an inductor to store energy received from one or more energy sources and release the energy to supply the power to one or more loads and a controller to control charging of the inductor via activation of one or more of the harvester switches and discharging of the inductor via activation of one or more of the load switches.

Example 2 includes the subject matter of Example 1, wherein the controller time multiplexes activation of the harvester switches to charge the inductor to regulate voltages corresponding to each of the energy sources.

Example 3 includes the subject matter of Examples 1 and 2, wherein the controller time multiplexes activation of the load switches to discharge the inductor to regulate voltages corresponding to each of the loads.

Example 4 includes the subject matter of Examples 1-3, further comprising a battery switch to receive energy from a battery, wherein the controller further activates the battery switch and one or more of the load switches to regulate load voltages.

Example 5 includes the subject matter of Examples 1-4, wherein the controller activates the battery switch, the harvester switches and the load switches to regulate the load voltages.

Example 6 includes the subject matter of Examples 1-5, wherein the controller activates the battery switch, and deactivates the harvester switches and the load switches to charge the inductor.

Example 7 includes the subject matter of Examples 1-6, wherein the controller activates the battery switch and the harvester switches, and deactivates the load switches to charge the inductor.

Example 8 includes the subject matter of Examples 1-7, wherein the controller activates the harvester switches, and deactivates the battery switch and the load switches to charge the battery.

Example 9 includes the subject matter of Examples 1-8, wherein the controller comprises a zero current detector (ZCD) to detect zero current at the inductor, a plurality of harvester comparators to compare voltage received from each energy source to a maximum power voltage, a plurality of load comparators to compare voltage of each load to a reference voltage and a control unit to control activation of the harvester. switches and the load switches based on current detected by the ZCD at the inductor.

Example 10 includes the subject matter of Examples 1-9, wherein the controller comprises battery comparators to compare voltage received from the batter, wherein the controller monitors the battery comparators to prevent overcharging of the battery.

Example 11 includes the subject matter of Examples 1-10, wherein the controller generates asynchronous energy pulses to regulate load voltages.

Example 12 includes the subject matter of Examples 1-11, wherein the controller comprises a plurality of load comparators to compare an output voltage of each load to a reference voltage and a control unit to enable an energy pulse if one or more load comparators detect that a load output voltage is below the reference voltage.

Example 13 includes the subject matter of Examples 1-12, wherein the controller further comprises a pulse generator having a counter, wherein the pulse generator generates the energy pulse for a length of time proportional to a stored count value.

Example 14 includes the subject matter of Examples 1-13, wherein the controller further comprises a zero current detector (ZCD) to detect zero current at the inductor, wherein a count value at the counter is incremented upon detection of zero current at the ZCD and a determination that one or more of the load output voltages is below the reference voltage.

Example 15 includes the subject matter of Examples 1-14, wherein the count value at the counter is decremented upon detection of the zero current and a determination that no load output voltage is below the reference voltage.

Some embodiments pertain to Example 16 that includes a power regulator comprising a switch to receive an energy source, a plurality of load switches, each coupled to supply power to a separate load, an inductor to store energy received energy source during activation of one or more of the harvester switches and release the energy during activation of one or more of the load switches and a controller to generate asynchronous energy pulses to regulate power voltage to the loads.

Example 17 includes the subject matter of Example 16, wherein the controller comprises a zero current detector (ZCD) to detect zero current at the inductor, a plurality of load comparators to compare an output voltage of each load to a reference voltage and pulse generator to generate an energy pulse if one or more load comparators detect that a load output voltage is below the reference voltage.

Example 18 includes the subject matter of Examples 16 and 17, wherein the pulse generator comprises a counter, wherein the pulse generator generates the energy pulse for a length of time proportional to a count value stored in the counter.

Example 19 includes the subject matter of Examples 16-18, wherein the counter increments a count value upon detection of zero current at the ZCD and a determination that one or more of the load output voltages is below the reference voltage.

Example 20 includes the subject matter of Examples 16-19, wherein the counter decrements the count value upon detection of the zero current and a determination that no load output voltage is below the reference voltage.

Some embodiments pertain to Example 21 that includes a power regulation method comprising determining whether zero current has been detected at an inductor, time multiplexing reception of a plurality of harvested energy sources to charge the inductor upon a determination that zero current has been detected at an inductor and time multiplexing discharging of the inductor to deliver energy to a plurality of loads upon a determination that zero current has not been detected at an inductor.

Example 22 includes the subject matter of Example 16, further comprising receiving energy from a battery and regulating voltage to one or more of the plurality of loads using energy received from the battery.

Example 23 includes the subject matter of Examples 21 and 22, further comprising regulating voltage to one or more of the plurality of loads using energy received from the battery and energy received from one or more of the plurality of energy sources.

Example 24 includes the subject matter of Examples 21-23, further comprising charging the inductor using energy received from the battery.

Example 25 includes the subject matter of Examples 21-24, further comprising charging the inductor using energy received from the battery and energy received from one or more of the plurality of energy sources.

Although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:
1. A power regulator comprising:
a plurality of harvester switches, each coupled to receive energy from a separate one of a plurality of energy sources;
a plurality of load switches, each coupled to supply power to a separate one of a plurality of loads;

an inductor to store energy received from one or more of the plurality of energy sources and release the energy to supply the power to one or more of the plurality of loads; and a controller to control timing and charging of the inductor via activation of one or more of the plurality of harvester switches and discharging of the inductor via activation of one or more of the plurality of load switches, wherein the controller is further to generate a number of asynchronous energy pulses to regulate a load voltage of each load, wherein the number of the asynchronous energy pulses is determined by comparing the load voltage with a threshold voltage.

2. The power regulator of claim 1, wherein the controller time multiplexes the activation of the plurality of harvester switches to charge the inductor to regulate the load voltage corresponding to each of the plurality of energy sources.

3. The power regulator of claim 2, wherein the controller time multiplexes the activation of the plurality of load switches to discharge the inductor to regulate the load voltage of each of the plurality of loads.

4. The power regulator of claim 3, further comprising a battery switch to receive the energy from a battery, wherein the controller further activates the battery switch and one or more of the plurality of load switches to regulate the load voltages.

5. The power regulator of claim 4, wherein the controller activates the battery switch, the plurality of harvester switches and the loud switches to regulate the load voltages.

6. The power regulator of claim 5, wherein the controller activates the battery switch, and deactivates the plurality of harvester switches and the plurality of load switches to charge the inductor.

7. The power regulator of claim 6, wherein the controller activates the battery switch and the plurality of harvester switches, and deactivates the plurality of load switches to charge the inductor.

8. The power regulator of claim 7, wherein the controller activates the plurality of harvester switches, and deactivates the battery switch and the plurality of load switches to charge the battery.

9. The power regulator of claim 4, wherein the controller comprises:
a zero current detector (ZCD) to detect zero current at the inductor;
a plurality of harvester comparators, each to compare a voltage received from each of the plurality of energy sources to a maximum power voltage;
a plurality of load comparators, each to compare the load voltage of each load to a reference voltage; and
a control circuit to control the activation of the plurality of harvester switches and the plurality of load switches based on the ZCD current detected by the ZCD at the inductor.

10. The power regulator of claim 9, wherein the controller comprises battery comparators to compare a voltage received from the battery, wherein the controller monitors the battery comparators to prevent overcharging of the battery.

11. The power regulator of claim 1, wherein the controller comprises:
a plurality of load comparators to compare the load voltage of each load to a reference voltage; and
a control circuit to enable an energy pulse of the asynchronous energy pulses if one or more of the plurality of load comparators detect that one or more of the load voltages are below the reference voltage.

12. The power regulator of claim 11, wherein the controller further comprises a pulse generator having a counter, wherein the pulse generator generates the energy pulse of the asynchronous energy pulses for a length of time proportional to a stored count value.

13. The power regulator of claim 12, wherein the controller further comprises a zero current detector (ZCD) to detect zero current at the inductor, wherein a count value at the counter is incremented upon detection of the zero current at the ZCD and a determination that the one or more of the load output voltages are below the reference voltage.

14. The power regulator of claim 13, wherein the count value at the counter is decremented upon the detection of the zero current and a determination that none of the load output voltages are below the reference voltage.

15. A power regulator comprising:
a switch to receive energy from an energy source;
a plurality of load switches, each coupled to supply power to a separate one of a plurality of loads;
an inductor to store the energy received from the energy source during activation of one or more of a plurality of harvester switches of the switch and release the energy during activation of one or more of the plurality of load switches of the switch; and
a controller to generate a number of asynchronous energy pulses to regulate a load output voltage of each load, wherein the number of asynchronous energy pulses is determined by comparing the load output voltage with a threshold voltage.

16. The power regulator of claim 15, wherein the controller comprises:
a zero current detector (ZCD) to detect zero current at the inductor;
a plurality of load comparators to compare the load output voltage of each load to a reference voltage; and
B a pulse generator to generate an energy pulse of the asynchronous energy pulses if one or more of the plurality of load comparators detect that one or more of the load output voltages are below the reference voltage.

17. The power regulator of claim 16, wherein the pulse generator comprises a counter, wherein the pulse generator generates the energy pulse of the asynchronous energy pulses for a length of time proportional to a count value stored in the counter.

18. The power regulator of claim 17, wherein the counter increments a count value upon detection of the zero current at the ZCD and a determination that none of the load output voltages are below the reference voltage.

19. The power regulator of claim 18, wherein the counter decrements the count value upon the detection of the zero current and a determination that none of the load output voltages are below the reference voltage.

* * * * *